A. ROSENBERG & A. H. ROSENTHAL.
PUNCTURE PROOF TREAD BLOCK FOR PNEUMATIC TIRES.
APPLICATION FILED JUNE 13, 1918.
1,292,519.
Patented Jan. 28, 1919.
2 SHEETS—SHEET 1.
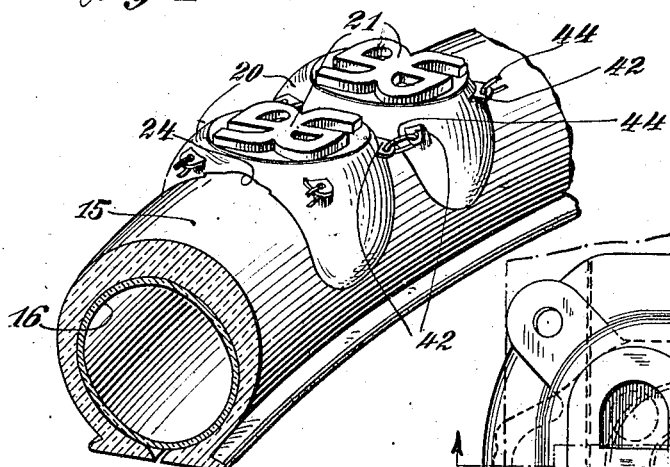
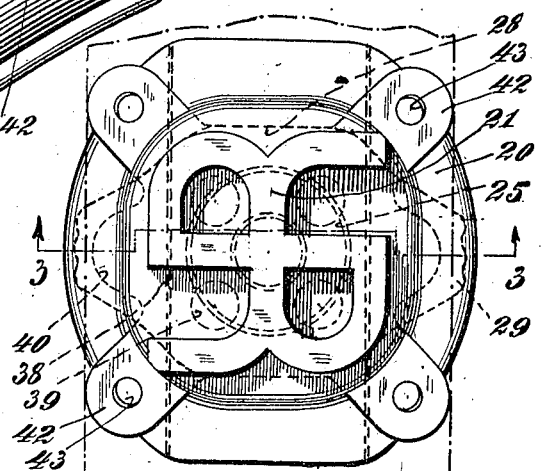
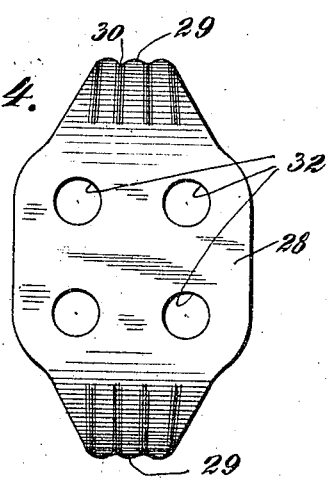
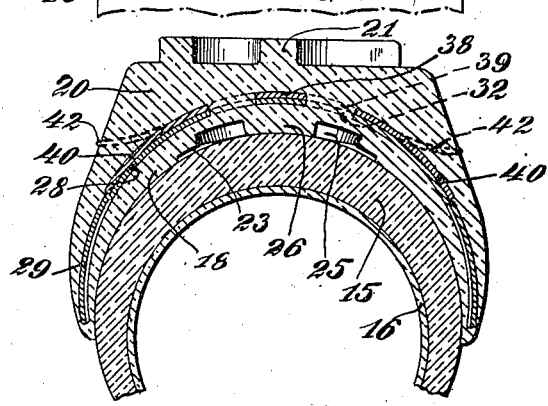
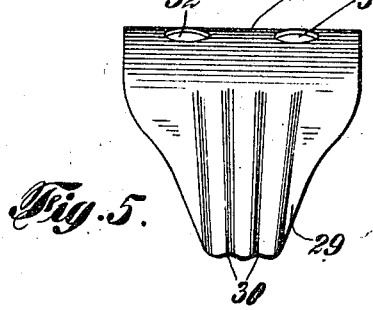
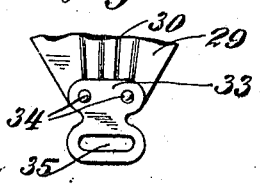
Inventors
Abraham Rosenberg and
Ambrose H. Rosenthal
By their Attorney
Eugene Pearl

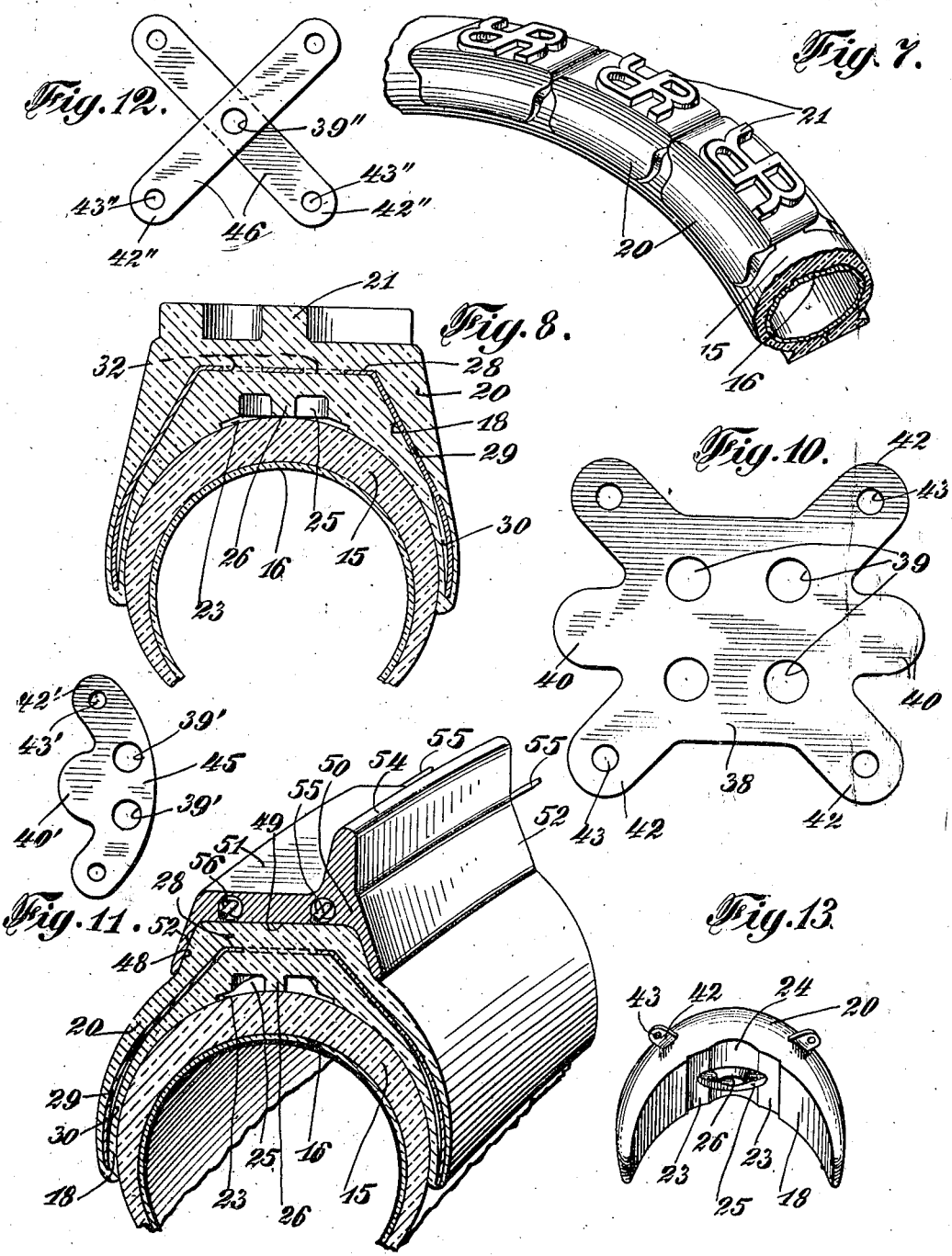

UNITED STATES PATENT OFFICE.

ABRAHAM ROSENBERG AND AMBROSE H. ROSENTHAL, OF BROOKLYN, NEW YORK.

PUNCTURE-PROOF TREAD-BLOCK FOR PNEUMATIC TIRES.

1,292,519.	Specification of Letters Patent.	Patented Jan. 28, 1919.

Application filed June 13, 1918. Serial No. 239,765.

*To all whom it may concern:*

Be it known that we, ABRAHAM ROSENBERG and AMBROSE H. ROSENTHAL, citizens of the United States, and residents of Brooklyn, in the county of Kings and State of New York, have invented certain new and useful Improvements in Puncture-Proof Tread-Blocks for Pneumatic Tires, of which the following is a specification.

This invention relates to improvements in vehicle treads and particularly to types using pneumatic or inflatable inner tubes by which a desired resiliency is obtained.

One of the principal objects of the invention is to provide tread blocks which may be firmly engaged with the tread of the vehicle, the blocks being so constructed as to resist perforation, forming in fact an armor for the tread.

Another object is to provide means whereby a plurality of tread blocks may be engaged with the periphery of the tire, forming a continuous unbroken row completely around its circumference.

Another object is to provide blocks which may be caused to adhere to the material of the tread by vulcanization forming a unitary construction.

Still another object is to provide means combined with the blocks whereby they may be firmly secured to the tire, either as units or in an assemblage.

Further objects are to provide tread blocks containing within their structure metallic plates adapted to prevent punctures, blowouts and the like, the armor elements extending over the periphery and along the sides of the tire; to provide the tread blocks with a surface adapted to prevent skidding, slipping or sliding in any direction, at the same time having the effect of gears in connection with the surface over which the vehicle operates; to provide means whereby single tread block elements may be clamped independently to the tire, and finally, to provide a tread which may be applied to a vehicle wheel of ordinary construction, enabling the same to be used with entire facility over railroad tracks.

These and other like objects, which will become more fully manifest as the description progresses, are attained by the novel construction and combination of parts hereinafter described and shown in the accompanying drawings, forming a material part of this specification, and in which:—

Figure 1 is a fragmentary perspective view, showing a pair of tread blocks made in accordance with the invention and indicating their application to a tire of conventional construction.

Fig. 2 is a plan view, showing a single tread block and the protruding elements formed therewith.

Fig. 3 is a fragmentary transverse sectional view taken on line 3—3 of Fig. 2.

Fig. 4 is a plan view, showing one of the metallic reinforcing plates used within the tread block.

Fig. 5 is a side elevational view of the same.

Fig. 6 is a fragmentary side elevational view of the same, showing an attachment thereto.

Fig. 7 is a perspective view, showing a number of tread blocks engaged by vulcanizing on a conventional form of tire.

Fig. 8 is an enlarged transverse sectional view taken through a tire made in accordance with Fig. 7.

Fig. 9 is an enlarged sectional and fragmentary perspective view, showing a similar form of tire and rail engaging device connected therewith.

Fig. 10 is a plan view, showing another metallic reinforcing plate adapted to be embedded in the tread block.

Fig. 11 is a plan view showing a modified form of reinforcing plate used alternately with Fig. 10.

Fig. 12 is a plan view showing a further modified form of the same, and

Fig. 13 is a perspective view of one of the tread blocks showing its lower and side surfaces.

Throughout all of the several drawings the numeral 15 designates a conventional type of tread, as used upon vehicle wheels of the better grade, the same containing an inflatable inner tube 16, arranged in the usual manner.

Each of the several tread blocks comprises an inner element 18, formed with an outer or contacting element 20, the outer element having a raised irregular surface 21, which may be of any fanciful design and which has the effect of impinging upon the surface over which the vehicle operates in a manner to prevent lateral movement and also to improve the traction of the wheel.

Formed in the concave side of the inner element 18 are longitudinal slots 23, curved upward at their center 24 and containing an annular recess 25 having a central projection 26, its end extending coincidentally with the surface of the element 18, materially aiding in holding the tread block in position, while the slots 23 and 24 permit air to circulate serving to keep the tire cool.

Inserted between the elements 18 and 20 are metal guard plates, comprising a body portion 28, curved in conformity with the tread of the tire, the extending ends 29 being reduced in width and corrugated, as indicated at 30.

Formed through the upper portion of the metallic reinforcing plates 28 are a plurality of holes 32, (four being shown), which, in addition to the corrugations of the end elements, serve to hold the plate firmly embedded in the material of the tread blocks.

Where single tread blocks are used temporarily for repair purposes, the ends 29 of these elements may have secured to them clips 33, secured by rivets 34 or like fastenings, the ends of the clips extending outward through the material of the tread blocks and formed with elongated slots 35, receptive of straps or other like fastenings (not shown) which may be passed around the inner surface of the tire thus holding each block firmly in position.

In addition to the reinforcing plate 28, use may also be made of a supplementary reinforcing plate 38, superposed thereon and formed with openings 39, so that the tread block material may be vulcanized, portions passing through the openings 32 and 39, acting as dowels and holding the structure firmly together.

Formed upon opposite sides of the plates 38 are projections 40, having curved exterior edges and bent to be seated closely on the upper surface of the plates 28 in an overlapping manner.

Also formed with the plates 30 are corner extensions containing perforations 43, receivable of links 44, by which the several tread blocks may be connected together, as can best be seen in Fig. 1.

Alternative forms of outer plate construction are indicated in Figs. 11 and 12, in the former of which a plate 45 is provided with openings 39', center projections 40', and angular corner projections 42' containing perforations 43', the same being essentially like the plates 38, cut in half.

In Fig. 12 a simpler form of construction may be observed in which a pair of cross strips 46 are provided with a central opening 39'', the extending ends 42'' of the strip having perforations 43'' for the purpose of connecting the blocks together, and it will be obvious that other forms than those indicated may be used for the same general purpose while the central openings may be of any desired shape or size.

It is to be understood that these tread blocks are intended to be rigidly engaged with the outer surface of the tread of the wheel, by vulcanizing the material firmly thereto, while the outer and inner portions of the tread blocks are similarly secured together so as to firmly embed the plates between, or if desired supplementary fastenings may be used in connecting the sections through openings in the plates.

In the modification shown in Figs. 7 and 8 a substantially similar structure is presented, with the exception that the secondary or exterior reinforcing plates can be omitted or not while the side elements of the block are elongated so as to extend farther over the side of the tread.

This is also true of the modified form shown in Fig. 9, other changes appearing in the shape of the peripheral contacting surface of the element 20, in which the raised surfaces 21 are omitted and the sides 48 beveled, presenting a flat circumferential face extending completely across the blocks, which are arranged closely adjacent so as to present a substantially unbroken surface adapted to receive a sectional metallic band 50, having a tread surface 51, and formed with angular flanges 52 adapted to make contact with the sides 48 of the tread blocks.

Rising from one side of the tread face 51 is a raised annular flange 54, adapted to make contact with the side of a rail head upon which the tread 51 engages, thereby providing a device which may be used in traveling over the trackway of a railroad.

These bands may be made in two or more sections so as to be engaged with the tire at any desired time, and through the tread portion extend longitudinal openings receptive of wires 55, which may be engaged at their abutting ends by nuts or other suitable fastenings (not shown) entering the enlarged annular openings 56, formed in the abutting ends of the elements 51, thereby providing an efficient means for maintaining a vehicle upon the track of a railroad.

The devices presented obviously will overcome the danger of puncture from contact with articles upon a road way, the reinforcing armor plates 28 and 38 obviously preventing the passing of sharp articles through the tire, while the several raised surfaces operate to overcome skidding and assist materially in the traction effects attained by the wheels.

From the foregoing it will be seen that a construction has been presented well adapted to attain all of the several objects pointed out in a simple and efficient manner, and it will be understood that the construction described and shown is to be regarded as illustrative and not restrictive, the parts being subject to minor modifications without departing from the general scope of the invention.

Having thus described our invention what we claim as new, and desire to secure by Letters Patent is:

1. In a tire guard, the combination with the tire body, of a plurality of resilient tire blocks arranged in a circumferential row around its periphery, said tire blocks being reinforced and vulcanized to the surface of the said tire, and longitudinal recesses formed in said blocks on the sides engaged with said tire.

2. In a tire guard, the combination with a resilient tire, of a plurality of tread blocks disposed in a row circumferentially about said tire, in close proximity to each other, and metallic plate inserts in said tread blocks, said inserts extending outward at the corners thereof.

3. A tire tread block, comprised of inner and outer layers of resilient material, metallic plates inserted between said layers, said plates being curved substantially concentric with the tire and having openings radial with the center of the tire through which the resilient material passes when in a semi-plastic state, said inner and outer layers being integrally connected together by vulcanization.

4. A tire tread block, comprising an inner layer of resilient material shaped to conform to the tread of a tire, a metallic plate partially enveloping said inner element, said metallic plate having openings formed therethrough, corrugated end elements formed with said metallic plate, and an outer resilient layer integrally united with said inner layer completely enveloping said metallic plate.

5. A tire tread block comprising inner and outer resilient elements, an apertured metallic plate embedded therebetween, said inner and outer elements being integrally connected through the apertures and around the margins of said plate, and means formed with said plate extending outward at the corners of said outer element whereby said blocks may be connected together in a row around the surface of the tire.

6. In a tread block for pneumatic tires, the combination with inner and outer resilient elements, of a metallic reinforcing plate bent to conform substantially to the cross-section of said tread, a supplementary plate arranged adjacent to said reinforcing plate, means formed in said supplementary plate whereby it may be firmly embedded in the outer of said resilient elements, projections formed at the corners of said supplementary plates, said projections extending through the surface of said upper element, and links connecting said projections so as to form a row of blocks around the circumference of a tire.

7. In a tire tread, the combination with the tread of a vehicle, of a plurality of tread elements arranged in a circumferential row and vulcanized to said tread, each of said tread elements comprising an inner and outer member and reinforcing guard plates embedded therebetween.

In testimony whereof we have signed our names to this specification.

ABRAHAM ROSENBERG.
AMBROSE H. ROSENTHAL.